United States Patent [19]
Sakazaki

[11] Patent Number: 5,982,978
[45] Date of Patent: Nov. 9, 1999

[54] MAGNETIC RECORDING/REPRODUCING APPARATUS AND DATA ARRANGING METHOD FOR USE IN THE APPARATUS

[75] Inventor: Yoshihisa Sakazaki, Kanagawa-ken, Japan

[73] Assignee: Kabushiki Kaisha Toshiba, Kawasaki, Japan

[21] Appl. No.: 08/736,238

[22] Filed: Oct. 23, 1996

[30] Foreign Application Priority Data

Oct. 23, 1995 [JP] Japan .................................. 7-274428

[51] Int. Cl.[6] .................................................. H04N 5/783
[52] U.S. Cl. ............................................. 386/68; 386/79
[58] Field of Search ................................. 386/46, 80, 81, 386/68, 111, 112, 104, 79, 95; 360/32, 48; H04N 5/783

[56] References Cited

U.S. PATENT DOCUMENTS

| | | | |
|---|---|---|---|
| 5,596,581 | 1/1997 | Saeijs et al. | 386/104 |
| 5,684,917 | 11/1997 | Yanagihara et al. | 386/80 |

FOREIGN PATENT DOCUMENTS

| | | |
|---|---|---|
| 0 606 856 A2 | 7/1994 | European Pat. Off. . |
| 0 613 297 A2 | 8/1994 | European Pat. Off. . |
| 0 650 296 A2 | 4/1995 | European Pat. Off. . |
| 0 655 864 A2 | 5/1995 | European Pat. Off. . |
| 0 668 697 A2 | 8/1995 | European Pat. Off. . |
| 0 673 157 A2 | 9/1995 | European Pat. Off. . |
| 7-320413 | 12/1995 | Japan . |

*Primary Examiner*—Huy Nguyen
*Attorney, Agent, or Firm*—Pillsbury Madison & Sutro LLP

[57] ABSTRACT

Special reproduction data from a special reproduction data generating circuit is applied to a special reproduction data arranging circuit. A frame-change flag that changes for unit of frame and a positional sequence signal that is initialized by the frame-change flag and is incremented in unit of special data of a special reproduction data position are supplied to the special reproduction data arranging circuit. The special reproduction data arranging circuit arranges dummy data instead of the next frame data on the subsequent special reproduction data positions when a frame is changed so that a positional sequence signal is not initialized more than twice in one repetitive recording area. Thus, it becomes possible to rearrange data using a positional sequence signal in the reproduction.

4 Claims, 9 Drawing Sheets

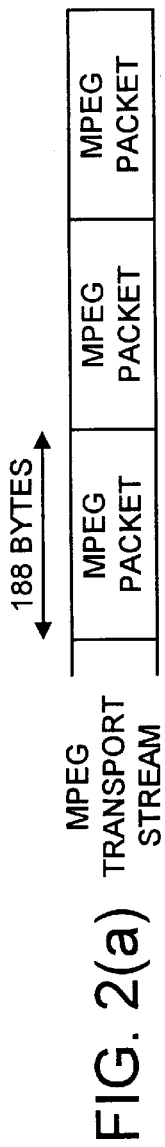
FIG. 2(a) MPEG TRANSPORT STREAM
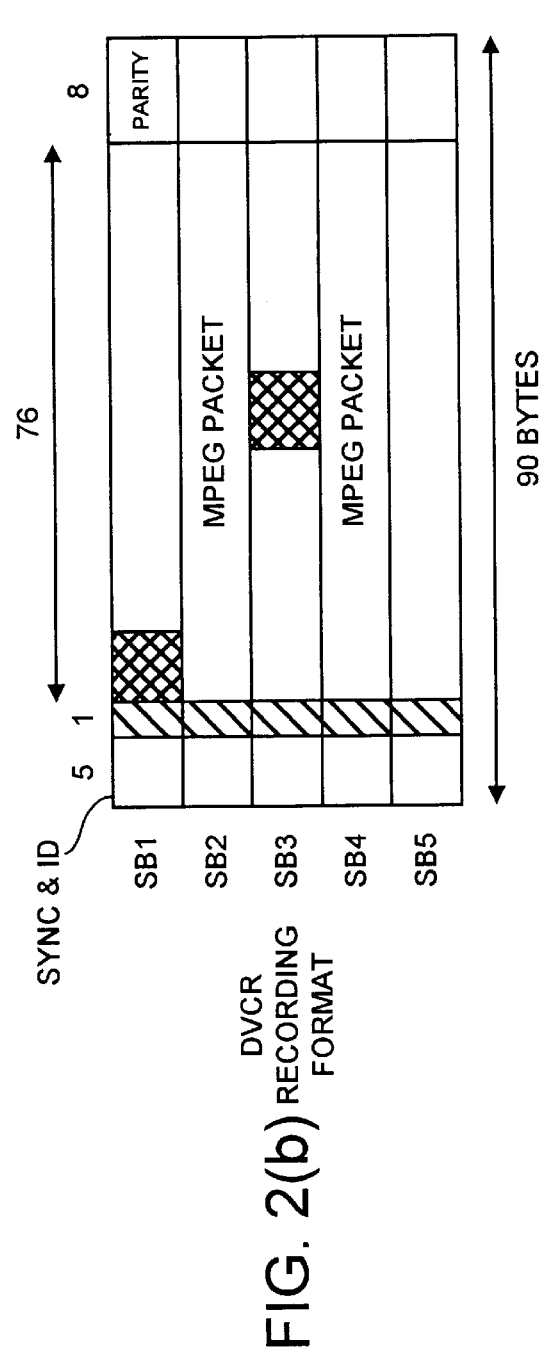
FIG. 2(b) DVCR RECORDING FORMAT
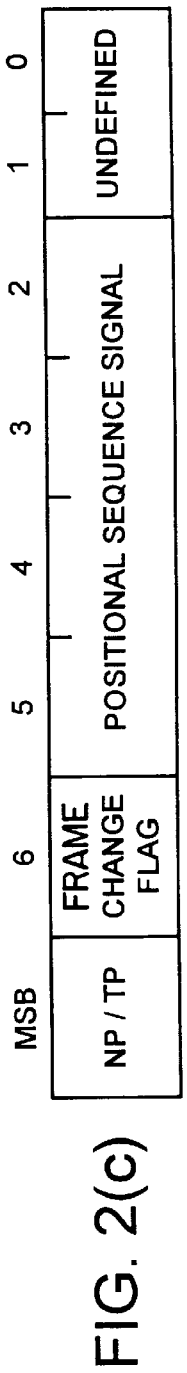
FIG. 2(c)

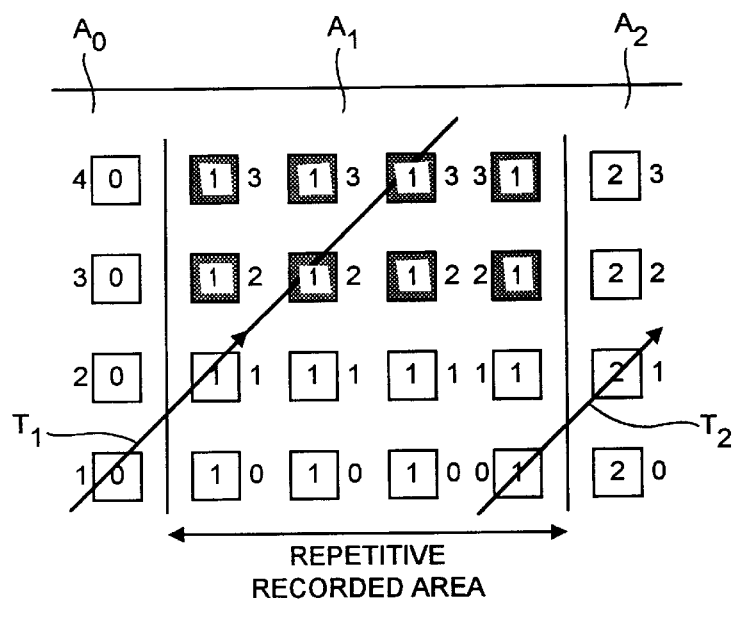
FIG. 3
FIG. 4(a) POSITIONAL SEQUENCE SIGNAL
FIG. 4(b) FRAME ID
FIG. 4(c) FRAME CHANGE FLAG

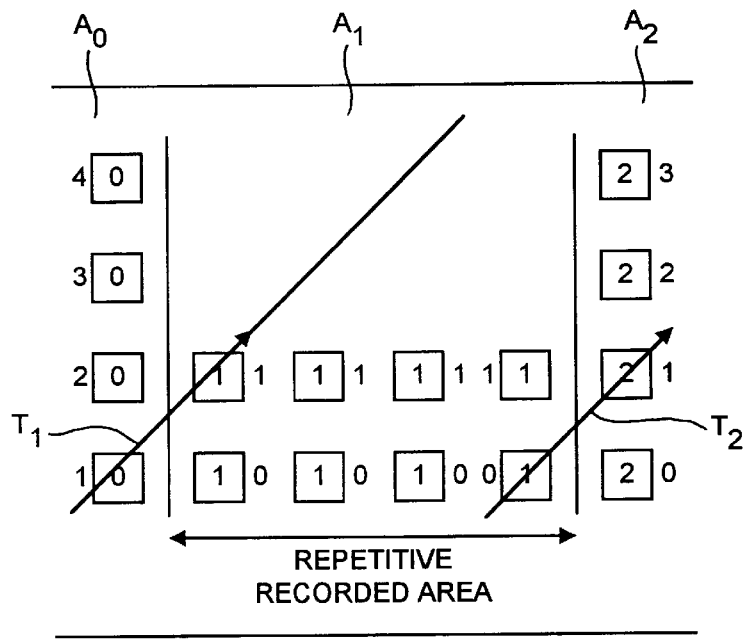
FIG. 6
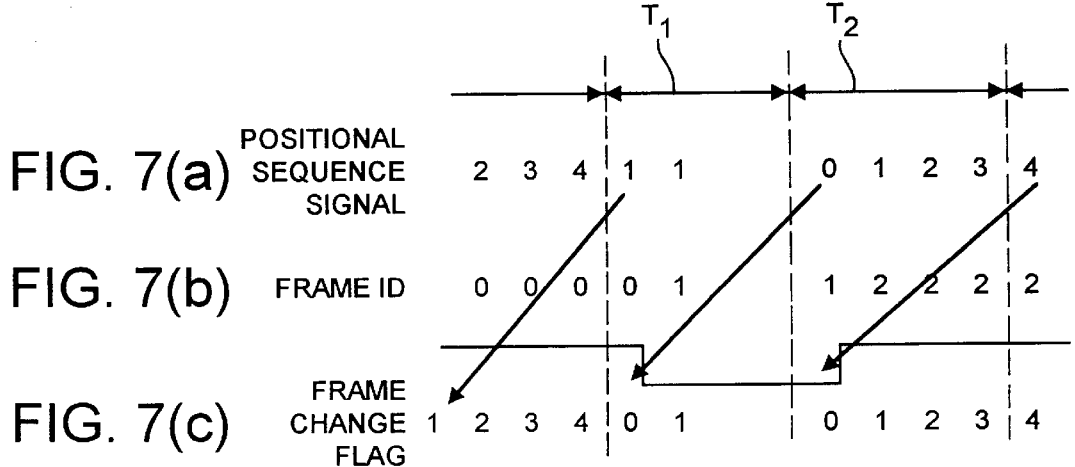
FIG. 7(a) POSITIONAL SEQUENCE SIGNAL
FIG. 7(b) FRAME ID
FIG. 7(c) FRAME CHANGE FLAG

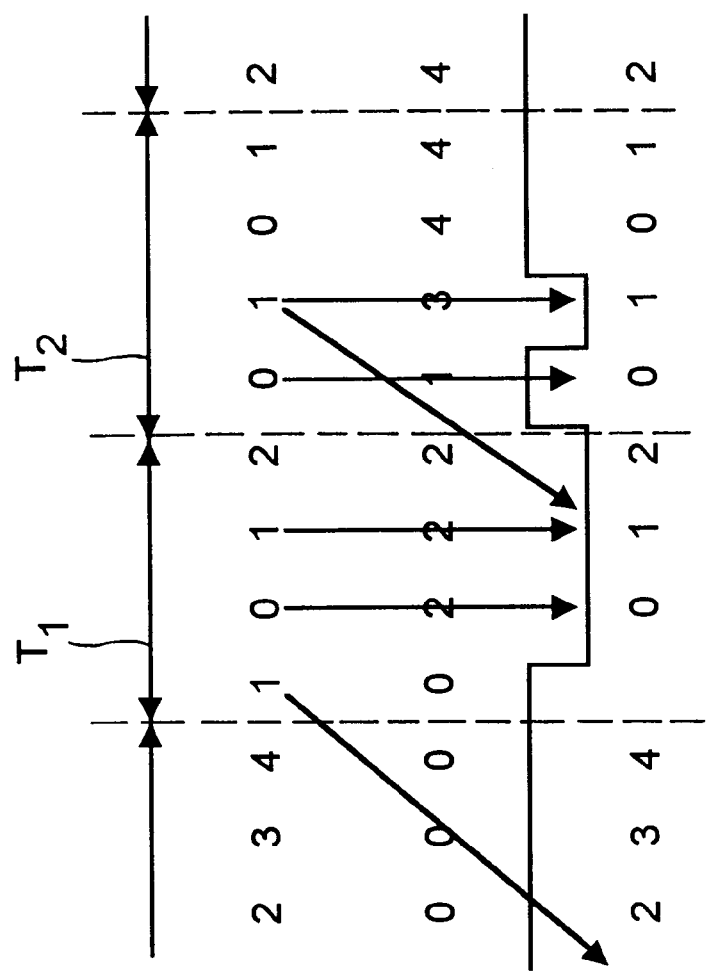

MAGNETIC RECORDING/REPRODUCING APPARATUS AND DATA ARRANGING METHOD FOR USE IN THE APPARATUS

FIELD OF THE INVENTION

The present invention relates to a magnetic recording/reproducing apparatus for performing recording/reproducing of digital signals using rotary heads and a data arranging method for use in the apparatus.

BACKGROUND OF THE INVENTION

Digital processing of images has been studied in recent years. Various systems for recording digital image data with magnetic recording/reproducing apparatus (referred to as a VCR, hereafter) have been also studied. In general, when video signals are digitized, the amount of information becomes enormous and the transmission or recording, etc. of information without compression is difficult from the aspects of communication speed and expenses, etc.

Because of the above, image compression technology is indispensable in the transmission or recording of digital video signals and various drafts of standards have been examined in recent years. The MPEG (Moving Picture Experts Group) system has been standardized for moving pictures. In this MPEG system, video signals are encoded using a combination of DTC (Discrete Cosine Transform) conversion, inter-frame predictive encoding, run-length encoding and entropy encoding. That is, in the MPEG system, video signals are not only compressed in one frame by DCT (the intra-frame compression), but also inter-frame compression for reduction of redundancy in the time axis direction using the inter-frame correlation is adopted. Inter-frame compression further reduces bit rate by encoding a difference between two successive frames utilizing the nature of general moving pictures that they resemble closely in the preceding and succeeding frames. In particular, motion compensated inter-frame predictive encoding for reducing predictive error by obtaining an inter-frame error by predicting the motion of a picture is effective.

A helical scanning type VCR reads information recorded on a magnetic tape by tracing the recording tracks formed on the magnetic tape by the rotary drum heads. In normal reproduction, the head tracing agrees with the recording tracks and no special problem is produced. However, in high speed reproduction, the head traces the recording tracks while crossing them. Accordingly, in high speed reproduction only information recorded on such portions wherein each head agrees with the recording track azimuth. Even in this case, in an analog recording where positions on a picture correspond to the recorded positions on a recording medium, it is possible to reproduce one frame.

However, if the amount of encoded intra-frame compression frames and inter-frames compression frames differ and image data compressed according to the MPEG system is recorded on a recording medium, the vertical position of the image data on the picture does not correspond to the vertical recording position on a recording medium and it is not necessarily possible to reproduce one frame from reproduced data in the high speed reproduction. Furthermore, since the inter-frame compressed data cannot be decoded from a single individual frame, reproduction may become impossible if the same frames are unable to be decoded in the high-speed reproduction.

So, in the specification of the Japanese Patent Application (TOKU-GAN-HEI) No. 6-065298 previously filed by the applicant of this patent application, a method for intermittently recording data for high-speed reproduction at track positions (hereinafter referred to as a special reproduction data position) through which the heads run across them in high-speed reproduction is proposed. During reproduction, high-speed special reproduction images are obtained by accurately tracing the data positions whereon the high speed special reproduction data are recorded. For instance, to enable four-times speed mode reproduction, important data are to be recorded on special reproduction data positions from where a sufficient envelope level is obtained in the four-times speed mode reproduction.

In the proposal described above, three kinds of signals of frequency f0, f1, f2 (hereinafter referred to as pilot signals f0, f1, f2) are used as pilot signals for tracking and the pilot signals f1, f0, f2, f0, f1, f0, f2, f0, . . . are recorded on each track by superposing them in that order. During reproduction, levels of the pilot signals f1, f2, f3 contained in reproduced signals are compared and so controlled that the compared levels match with each other, that is, to agree the track phase with the tracks on which the pilot signal f0 is superposed. In this case, it is possible to match the track phase with the track of the pilot signal f0 every four tracks if the shifting direction of track phase is considered.

It is possible to match the track phase with a track of the pilot signal f0 even in, high-speed mode reproduction Therefore, the trace line of the head in high-speed mode reproduction is decided according to the tracks of the pilot signal f0. By recording high-speed mode reproduction data on the thus decided trace line, high-speed mode reproduction is enabled.

In high-speed mode reproduction, the heads of the same azimuth will trace across two times of given special reproduction speed number of tracks. Accordingly, it is better to record data next to that data recorded on the specified special reproduction data position in the same positions on following tracks after the two times of the specific reproduction speed number of tracks. Further, the heads trace the same azimuth tracks by every four tracks. Therefore, making sure to reproduce data even when the trace is carried out at any portion on the two times of special speed number of tracks (hereinafter referred to as a repetitive recording area), it is necessary to repetitively record the same data on four tracks in the repetitive recording area.

FIG. 8 is an explanatory diagram for explaining the recording on the special reproduction data position.

In FIG. 8, assuming that tracks run in the vertical direction, the special reproduction data positions on each track are given by square symbols. The arrows in FIG. 8 show the trace lines by the same azimuth head in the four-times speed mode reproduction. As described above, the same data is recorded on the same position in each track of every four tracks in the repetitive recording area and as the trace lines cross the four tracks in the four-times speed mode reproduction, four pieces of data can be recorded on the special reproduction data positions in one repetitive recording area. That is, in FIG. 8 the special reproduction data position is provided to every track so that data can be reproduced from four special reproduction data positions on four tracks by one trace. For instance, as shown in FIG. 8, frames 0 through 3 are recorded in the repetitive recording area A0 and data 4 through 7 are recorded in the repetitive recording area A1.

In the repetitive recording area A1, data 5, 6 and 7 are reproduced along the trace line T1, while data 4 is reproduced along the trace line T2. When rearranging the reproduced data in order of data 5, 6, 7 and 4, the original data 4, 5, 6 and 7 can be restored. For facilitating this rearrangement, a positional sequence signal is added to each data. Figures at the sides of the square symbols in FIG. 8 show the positional sequence signals.

That is, frame data with the positional sequence signals 0, 5, 6 and 7 are sequentially reproduced along the trace line T1. While, frame data with the positional sequence signals 4, 9, 10 and 11 are sequentially reproduced along the trace line T2. FIG. 9 shows the positional sequence signals of reproduction data that are sequentially reproduced for each trace. As shown in FIG. 9(*a*), the positional sequences of the reproduction data by the traces around the repetitive recording area A1 have the order of . . . 1, 2, 3, 0, 5, 6, 7, 4, 9, 10, 11, 8, 12 . . . . When this reproduction data train is rearranged in order of the positional sequence signals, the reproduction data in the original data sequence can be obtained as shown in FIG. 9 (*b*).

Further, considering the reverse reproduction, a frame-change flag showing the frame change is also recorded. That is, in the reverse reproduction it is necessary to reproduce data in a frame in the positive sequence while reproduce them in unit of frame in the reverse sequence. Therefore, a frame-change flag is used to restore reproduction data in unit of frame. FIG. 9(*b*) shows that the frame-change flags are at the same level and there is no frame change.

Further, considering that data around the frame ends are recorded on mid-tracks or end-tracks in the repetitive recording area, the positional sequence signal is initialized at the timing of the frame change given by the frame-change flag.

By the way, in the MPEG system, etc. a relatively large data storage is normally needed for recording data for one frame and a plurality of repetitive recording areas are needed for recording one frame. However, in the progressive refresh system disclosed in the literature "Grand Alliance HDTV System Specification" submitted to the ACATS Technical Subgroup; 2, 22, 1994, pictures are updated in unit of slice of the MPEG data. Therefore, when this system is adopted, the amount of data in one frame of the special reproduction data becomes relatively small and the frame changes may be frequent.

However, there was a problem in this case that the data rearrangement could not be made properly. FIG. 10 is a diagram for explaining this problem.

In FIG. 10 it is also assumed that the tracks run in the vertical direction and the special reproduction data portion on each track is given by the squares. Further, the special reproduction data positions shown by the thick square symbol indicates that data at the top of frame (the frame starting point data) are recorded and numerals in the squares show the frame numbers. Further, figures at the sides of the squares show the positional sequence signals. In FIG. 10, the 0-th through the fourth frame data are recorded in repetitive recording areas A0 to A2.

As shown in FIG. 10, three special reproduction data positions except the special reproduction data positions at the lowest end of the repetitive recording area A0 and the lowest end of the repetitive recording area A1 are traced along the trace line T1. Further, three special reproduction data positions except the special reproduction data position at the lowest end of the repetitive recording area A1 and the lowest end of the repetitive recording area A2 are traced along the trace line T2. The frame starting point data given by the thick square symbol is set to 0 since the positional sequence signal was initialized.

FIG. 11 (*a*) shows the reproduction data train obtained from the trains. The positional sequence signals of the reproduction data to be reproduced sequentially along the trace line T1 are 1, 0, 1, 2, respectively. The positional sequence signals of the reproduction data to be sequentially reproduced along the trace line T2 are 0, 1, 0, 1, respectively. FIG. 11(*b*) shows the frame numbers of these reproduction data. As shown in FIG. 11 (*c*), the positional sequence signal of the first reproduction data along trace line T1 is 1, this data is arranged before the reproduction data of the upper three special reproduction data positions on the repetitive recording area A0 and the reproduction data of the 0-th frame is properly arranged.

However, other positional sequence signals are arranged in the properly sequence as shown in FIG. 11 (*a*), and the reproduction data can not be rearranged. That is, the reproduction data of the first frame reproduced along trace line T2 is arranged between the last reproduction data of the second frame and the reproduction data of the third frame. Similarly, the third reproduction data by trace line T2 is the fourth frame data, but since the positional sequence signal is 0, it is arranged before the first data (the positional sequence signal in 0) of the third frame that is first reproduced by the next trace (not shown).

Thus, in a conventional method for rearranging special reproduction data using frame-change flags and positional sequence signals that are initialized at the changing point of frame-change flags, there was such a problem that data may not be rearranged properly if the amount of data of special reproduction data for one frame is small.

SUMMARY OF THE INVENTION

It is, therefore, an object of the present invention to provide a magnetic recording/reproducing apparatus that is capable of securely rearranging data even when the amount of special reproduction data for one frame is small and a data arranging method that is used for the data arrangement.

In order to achieve the above object, a magnetic recording/reproducing apparatus according to one aspect of the present invention for repetitively arranging tracks recorded with the same special reproduction data in a predetermined special reproduction format together with normal reproduction data over a special reproduction area wherein a head traces across the tracks at a predetermined special reproduction mode, includes a recording data arranging means for arranging the same special reproduction data on same recording position in the each track in the repetitive recorded special reproduction area, a special reproduction data generating means for generating special reproduction data from input normal reproduction data, a frame identification signal generating means for generating a frame identification signal indicating the frame of the special reproduction data generated from the special reproduction data generating means, a positional sequence signal generating means for generating a positional sequence signal to be sequentially allocated to each special reproduction data recording position on each track, which is initialized at a change timing of the frame identification signal, and a special reproduction data arranging means for providing the special reproduction data from the special reproduction data generating means to the recording data arranging means in conjunction with both the frame identification signal and the positional sequence signal, wherein the initialization of the positional sequence signal in the repetitive recorded special reproduction area is limited by one time at most.

A data arranging method according to the second aspect of the present invention for a magnetic recording/reproducing apparatus for repetitively arranging trucks recorded with same special reproduction data at a predetermined special reproduction format together with a normal reproduction data over a special reproduction area wherein a head traces across the tracks at a predetermined special reproduction mode, includes a recording data arranging process for arranging the same special reproduction data on the same recording position on each track in the repetitive recorded special reproduction area, a special reproduction data generating process for generating special reproduction data from input normal reproduction data, a frame identification signal generating process for generating frame identification signal indicating frame the special reproduction data generated from the special reproduction data generating means, a positional sequence signal generating process for generating a positional sequence signal to be sequentially allocated to each special reproduction data recording position on each track, which is initialized at a change timing of the frame identification signal, and a special reproduction data arranging process for providing the special reproduction data from the special reproduction data generating means to the recording data arranging means in conjunction with both the frame identification signal and the positional sequence signal wherein the initialization of the positional sequence signal in the repetitive recorded special reproduction area is limited by one time at most.

In the first aspect of the present invention, the special reproduction data generating means generates special reproduction data from normal reproduction data and provides them to the special reproduction data arranging means. Also provided the special reproduction data arranging means are, the frame identification signal from the frame identification signal generating means and the positional sequence signal from the positional sequence signal generating means are also applied to the special reproduction arranging means. The special reproduction data arranging means provides the special reproduction data to the recording data arranging means by adding the frame identification signal and the positional sequence signal. In this case, the special reproduction data arranging means limits the number of initializations of the positional sequence signal to one time in the repetitive recording area. As a result, it becomes possible to rearrange data using the positional sequence signal in the reproduction.

In the second aspect of the present invention, the frame identification signal showing frame unit and the positional sequence signal are added by the arranging procedure to the special reproduction data generated from the normal reproduction data. The arranging procedure limits the number of initializations of the positional sequence signal by the frame identification signal by one time in the repetitive recording area. As a result, it becomes possible to rearrange data using the positional sequence signal in the reproduction.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 2($a$)–2($c$) are a diagram for explaining the data arrangement of an embodiment of the present invention;

FIG. 3 is a diagram explaining the operation of an embodiment of the present invention;

FIGS. 4($a$)–4($c$) are a diagram explaining the operation of an embodiment of the present invention;

FIG. 6 is a diagram explaining the operation of the embodiment shown in FIG. 5;

FIGS. 7($a$)–7($c$) are a diagram explaining the operation of the embodiment shown in FIG. 5;

FIGS. 11($a$)–11($c$) are a diagram for explaining problems in a conventional example.

DESCRIPTION OF THE PREFERRED EMBODIMENTS

The present invention will be described in detail with reference to FIGS. 1 through 7.

Figure 1:
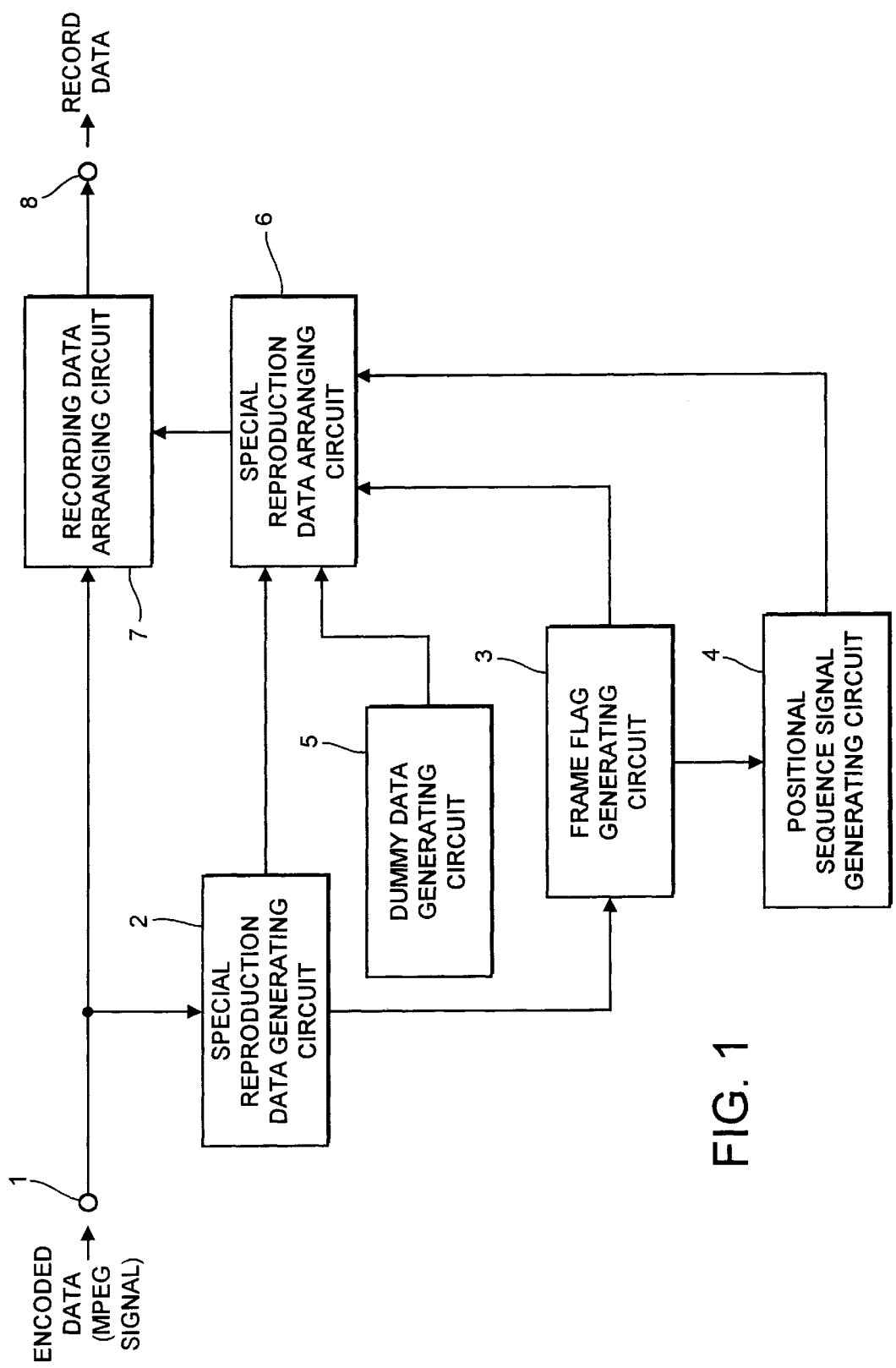
FIG. 1 is a block diagram showing one embodiment of a magnetic recording/reproducing apparatus according to the present invention.

FIG. 1 is a block diagram showing an embodiment of a magnetic recording/reproducing apparatus according to the present invention. This embodiment is an example of the apparatus for recording important data on special reproduction data positions which are always traced in the special reproduction and the same data are recorded on the special reproduction data positions at the same location on two times of high speed number of tracks (the repetitive recording area). The amount of data recorded on the special reproduction data position is smaller than that of the normal reproduction data position. Further, as the special reproduction data is repetitively recorded on parallel tracks, the amount of effective data that are recordable on the special reproduction data position is much less than the amount of data on the normal reproduction.

Encoded data of, for instance, MPEG signal is applied to an input terminal 1 via a transmission line (not shown). The encoded data may be data encoded according to, for instance, the progressive refresh system. The input encoded data is supplied to a special reproduction data generating circuit 2 and a recording data arranging circuit 7.

The special reproduction data generating circuit 2 extracts intra-frame compression data from the input encoded data. The special reproduction data generating circuit 2 generates special reproduction data based on the extracted intra-frame compression data. For instance, the special reproduction data generating circuit 2 takes out only the low frequency component of the extracted intra-frame compression data. Special reproduction data generated from the special reproduction data generating circuit 2 is given to a special reproduction data arranging circuit 6.

Further, whenever the generation of special reproduction data for one frame (frame data) is completed, the special reproduction data generating circuit 2 provides a control signal to a frame flag generating circuit 3. The frame flag generating circuit 3 generates a frame-change flag of which "1" and "0" are alternated corresponding to the starting point of frame data and provides it to a positional sequence signal generating circuit 4 and the special reproduction data arranging circuit 6.

The positional sequence signal generating circuit 4 is reset by the frame-change flag and generates a positional sequence signal showing the data sequence for every unit of data that is recorded on the special reproduction data positions on tracks of a magnetic tape (not shown). This positional sequence signal shows the data sequence to be rearranged in the data reproduction and is set at, for instance, "0" at the top of each frame data by the frame-change flag and is incremented by 1 for every special data unit and reset to "0" at a value corresponding to the number of reproduction speeds as the upper limit. This positional sequence signal is supplied to the special reproduction data arranging circuit 6.

The special reproduction data arranging circuit 6 is capable of arranging and outputting special reproduction data, frame-change flags and positional sequence signals. FIGS. 2(a)–2(c) are a diagram for explaining the data arrangement by the special reproduction data arranging circuit 6 shown in FIG. 1. FIG. 2 (a) shows a transport stream of the MPEG standard, FIG. 2 (b) is for explaining a packet conversion, and FIG. 2 (c) shows a construction of an additional ID.

In the MPEG standard, the MPEG transport stream is constructed by an MPEG packet in unit of 188-bytes as shown in FIG. 2 (a). On the contrary, for instance, in the SD standard which is a digital VCR standard, data is recorded in unit of 90-byte long sync block (SB) and the special reproduction data arranging circuit 6 carries out the packet conversion for allocating two MPEG packets across five sync blocks as shown in FIG. 2(b).

As shown in FIG. 2 (b), an ID in 5 bytes is arranged at the top of each sync block for identifying sync signal (SYNC) and packet. In this embodiment, an additional ID is arranged by the next one byte (the hatched section). In the additional ID, NP/TP is arranged at MSB (the most significant bit), a frame-change flag is the next bit, a positional sequence signal is the next four bits and two bits at the LSB (the least significant bit) are undefined.

The MPEG packets are arranged for 76 bytes next to each sync block and parity is arranged for the last 8 bytes. Further, the meshed section is a 3 byte time stamp.

Further, in this embodiment the output of a dummy data generating circuit 5 is also applied to the special reproduction data arranging circuit 6. The dummy data generating circuit 5 generates specified dummy data and provides it to the special reproduction data arranging circuit 6. If the frame data of the top of the specified frame is allocated to the special reproduction data position of the specified repetitive recording area, when the frame data allocation of that frame is completed, the special reproduction data arranging circuit 6 allocates and arranges dummy data to the last end of this repetitive recording area without allocating and arranging frame data of the next frame. Further, in this case the positional sequence signal is incremented for every special data unit and the frame-change flag remains unchanged.

The data train from the special reproduction data arranging circuit 6 is supplied to a recording data arranging circuit 7. The recording data arranging circuit 7 arranges input data conforming to the preset magnetic tape format and provides them to the output terminal 8 so that encoded data from the input terminal is recorded in the normal reproduction data position, and also, the output of the special reproduction data arranging circuit 6 is recorded in the special reproduction data position.

The data train from the output terminal 8 is recorded on a magnetic tape by a specified recording circuit (not shown) equipped with an error correcting code adding circuit, a modulation circuit, etc.

Next, operation of the embodiment as described above will be explained referring to FIGS. 3 and 4(a)–4(c). FIG. 3 shows the records and the trace lines on a magnetic tape. Further, FIG. 4 (a) shows positional sequence signals of reproduction data reproduced by the traces shown in FIG. 3. FIG. 4 (b) shows frame numbers of the reproduction data, and FIG. 4 (c) shows the frame-change flags and positional sequence signals of data after being rearranged.

Encoded data of the MPEG signal applied to the input terminal 1 are provided to the special reproduction data generating circuit 2 and the recording data arranging circuit 7. Inter-frame compression data is extracted from encoded data by the special reproduction data generating circuit 2. The special reproduction data generating circuit 2 provides the low frequency component of the intra-frame compression data to the special reproduction data arranging circuit 6 as special reproduction data.

Further, the special reproduction data generating circuit 2 outputs a control signal whenever the generation of special reproduction data for one frame is completed and based on this control signal, the frame flag generating circuit 3 generates a frame-change flag which changes corresponding to the starting point of frame data and provides it to the positional sequence signal generating circuit 4.

The positional sequence signal generating circuit 4 is set to "0" by the frame-change flag, generates a positional sequence signal that is incremented for every recording unit of the special reproduction data position on a magnetic tape and provides it to the special reproduction data arranging circuit 6.

The special reproduction data arranging circuit 6 carries out the packet conversion of the MPEG packet with sync block which is a recording unit and arranges an input frame-change flag and a positional sequence signal as an additional ID of each sync block. (FIG. 2(c)) The special reproduction data arranging circuit 6 provides the arranged special reproduction data to the recording data arranging circuit 7. The recording data arranging circuit 7 outputs the encoded data from the input terminal 1 at a time corresponding to the normal reproduction data position on a magnetic tape and outputs the special reproduction data from the special reproduction data arranging circuit 6 at a time corresponding to the special reproduction data position. The output of the recording data arranging circuit 7 is applied to a recording circuit (not shown) as recording data via the output terminal 8 and recorded on a magnetic tape.

Now, it is assumed that an amount of the special reproduction data of the first frame out of a series of special reproduction frame data generated by the special reproduction data generating circuit 2 is recordable on two special reproduction data positions and this frame data of the first frame is recorded from the top position of the repetitive recording area A1.

FIG. 3 shows this case. In FIG. 3, the tracks are assumed to be formed in the vertical direction and the squares show the special reproduction data of each track. Further, in FIG. 3, the special reproduction data position is provided to every track so that data can be reproduced from four special reproduction data positions on four tracks by one trace. Numerals in the squares show Frame Identification Numbers and numerals at the sides of the squares show the positional sequence signals. Further, the arrows in FIG. 3 show the trace lines by the same azimuth head.

Recording of the special reproduction frame data of the 0-th frame starts from the last special reproduction data positions on the tracks in the repetitive recording area before the repetitive recording area A0 and ends at the last special reproduction data positions on the tracks in the repetitive recording area A0. The positional sequence signal generating circuit 4 increments positional sequence signals for every special data unit and the special reproduction data arranging circuit 6 arranges a positional sequence signal in an additional ID of every sync block. Thus, as shown in FIG. 3, special reproduction data containing one through four positional sequence signals is recorded on each special reproduction data position on the tracks in the repetitive recording area A0.

When generation of the special reproduction data of the 0-th frame is completed, the special reproduction data generating circuit 2 provides a control signal showing the end of the frame data to the frame flag generating circuit 3 and at the same time, starts generation of the special reproduction data of the next first frame. The frame flag generating circuit 3 reverses a frame flag by the control signal and when the frame flag is reversed, the positional sequence signal generating circuit 4 resets the positional sequence signal to 0 and outputs it to the special reproduction data arranging circuit 6. Thus, 0 is added to the first data of the first frame as a positional sequence signal. As shown in FIG. 3, the frame data of the first frame containing the positional sequence signal 0 is thus recorded on the first special reproduction data positions on the tracks in the repetitive recording area A1.

The frame data with the positional sequence signal of 1 is recorded on the next special reproduction data position. As the frame data of the first frame is composed of two special data units as described above, the special reproduction date generating circuit 2 outputs the control signal showing the end of the frame data after generating special reproduction data for two special data units of the first frame.

The special reproduction data arranging circuit 6 records the top of frame data only one time in one repetitive recording area and when arrangement of the frame data of the first frame is completed in the repetitive recording area A1, the special reproduction data arranging circuit 6 arranges dummy data at the positions corresponding to the remaining two special reproduction data positions. Thus, dummy data is recorded on two special reproduction data positions of the repetitive recording area A1 given by the hatched squares in FIG. 3. Further, a positional sequence signal is also incremented for dummy data by the positional sequence signal generating circuit 4.

When the data arrangement at the position corresponding to the repetitive recording area A1 is complete, the special reproduction data arranging circuit 6 starts the arrangement of the frame data of the next frame. The frame flag generating circuit 3 reverses the flame flag and as a result, a positional sequence signal of 0 is added to the top data of the next frame. Thus, the top data of the next frame is recorded on the first special reproduction data position in the repetitive recording area A2. Thereafter, the recording shown in FIG. 3 is carried out in the similar manner while a positional sequence signal is incremented.

Now, it is assumed that a recorded magnetic tape is traced by the magnetic head so as to obtain the traces T1 and T2 shown in FIG. 3. The 0 frame data is reproduced from the lowest special reproduction data positions on the tracks in the repetitive recording area A0 along the trace line T1 and then, the first frame data is reproduced from the second special reproduction data positions on the tracks in the repetitive recording area A1 and then, the dummy data recorded on the third and the fourth special reproduction data positions of the repetitive recording area A1 are reproduced. That is, as shown in FIG. 4(a), positional sequence signals of data sequentially reproduced along the trace line T1 are 1, 1, 2 and 3, respectively.

Further, the top data of the first frame is reproduced from the lowest special reproduction data positions on the tracks in the repetitive recording area A1 along the trace line T2 and then, the second frame data is reproduced from the second special reproduction data positions on the tracks in the repetitive recording area A2. That is, as shown in FIG. 4(a), the positional sequence signals of the data sequentially reproduced along the trace line T2 are 0, 1, 2 and 3, respectively.

When reproduction data are rearranged in order of positional sequence signals, data on the lowest special reproduction data positions on the tracks in the repetitive recording area A0 reproduced along the trace line T1 is arranged in front of the reproduction data of the 0-th frame of the positional sequence signal 2. Similarly, the reproduction data of the lowest special reproduction data position in the repetitive recording area A1 reproduced along the trace line T2 is arranged in front of the reproduction data of the first frame of the positional sequence signal 1. In this manner, data can be rearranged in the proper sequence.

Thus, in this embodiment, if the recording of data of a new frame is started in the specified repetitive recording area by the special reproduction data arranging circuit, when the recording of data of that frame is completed, dummy data is recorded in this repetitive recording area without recording data of the next frame. As a result, the rearrangement of data using a positional sequence signal is made possible by limiting the frame change to one point in the repetitive recording area. Accordingly, even when one frame of special reproduction data has an amount of data smaller than the recordable amount of data in the repetitive recording area, the reproduction data can be securely rearranged.

Figure 5:
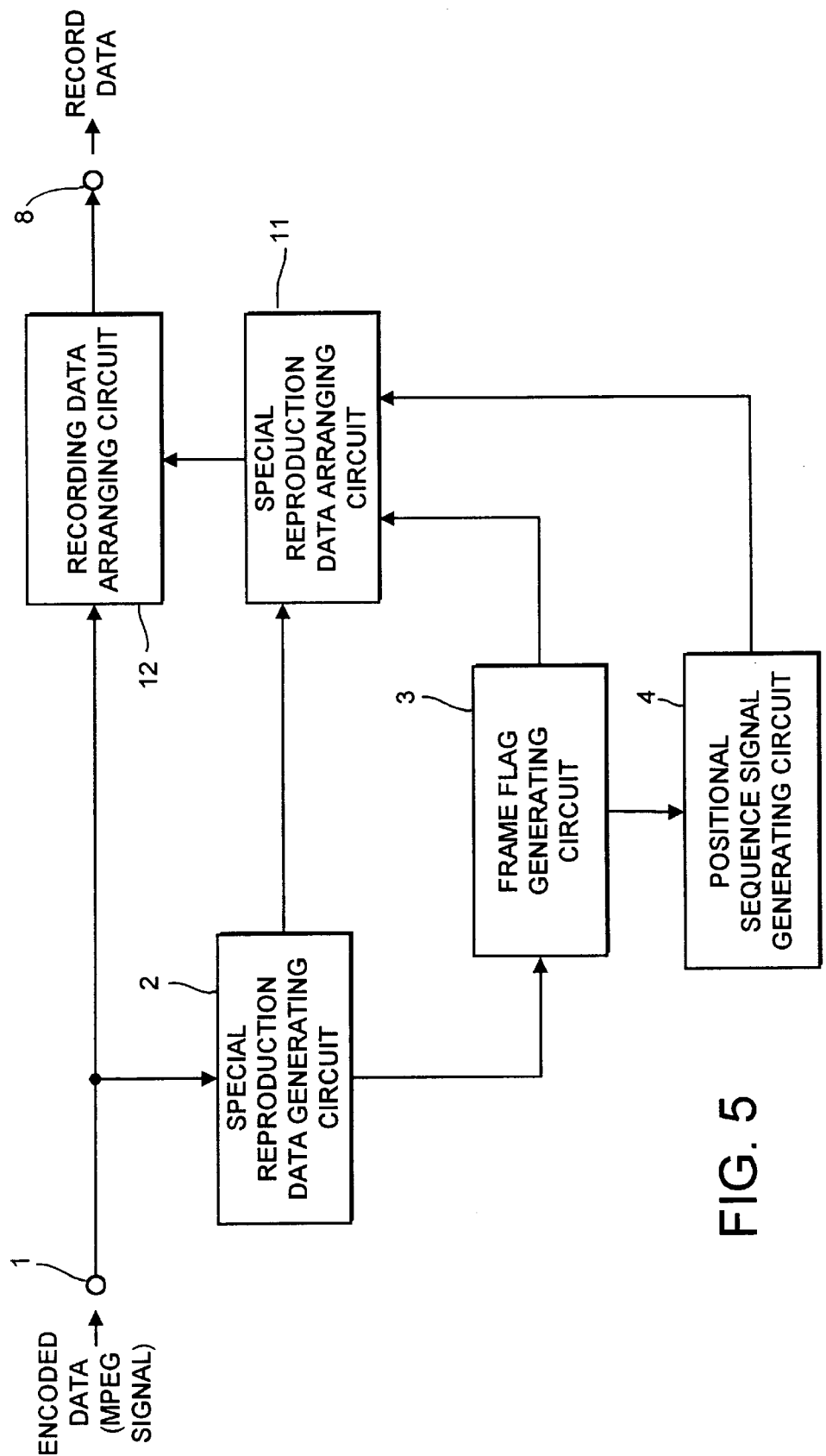
FIG. 5 is a block diagram showing another embodiment of the present invention.
Figure 8:
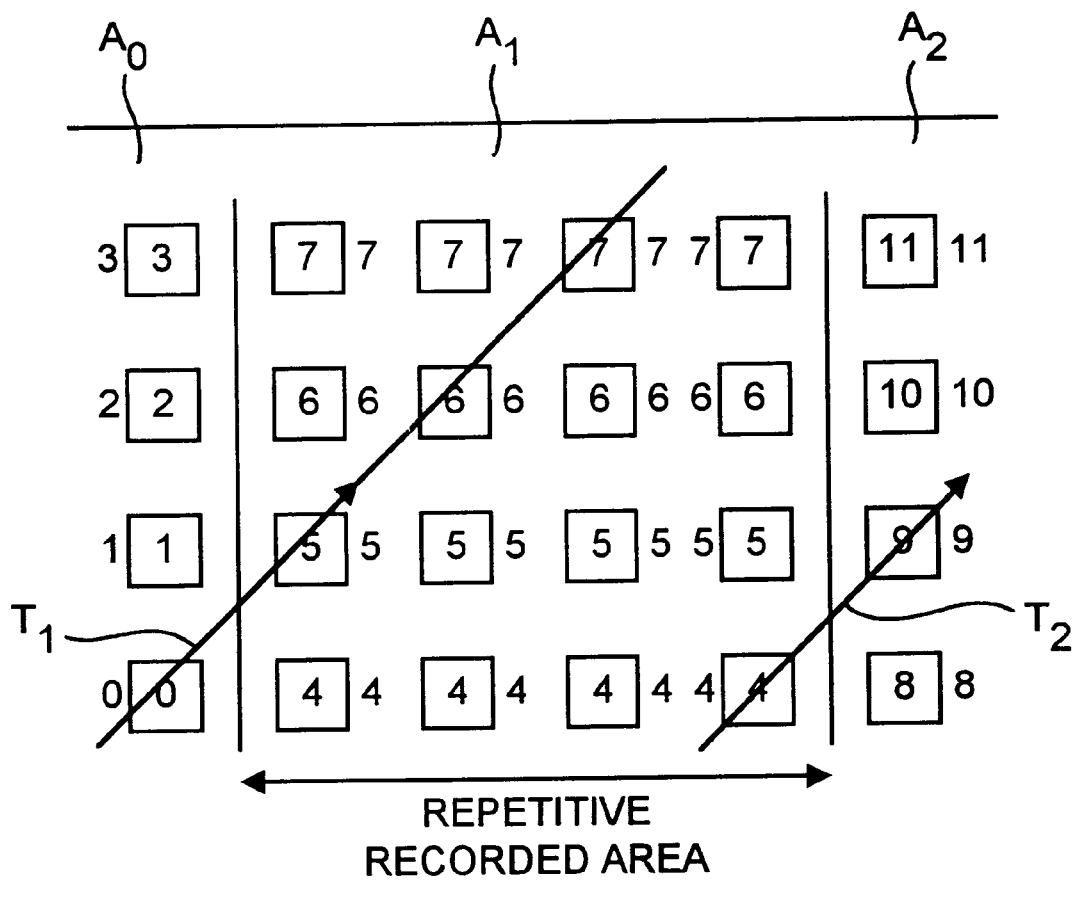
FIG. 8 is a diagram explaining the recording on the special reproduction data position.
Figures 9A, 9B:
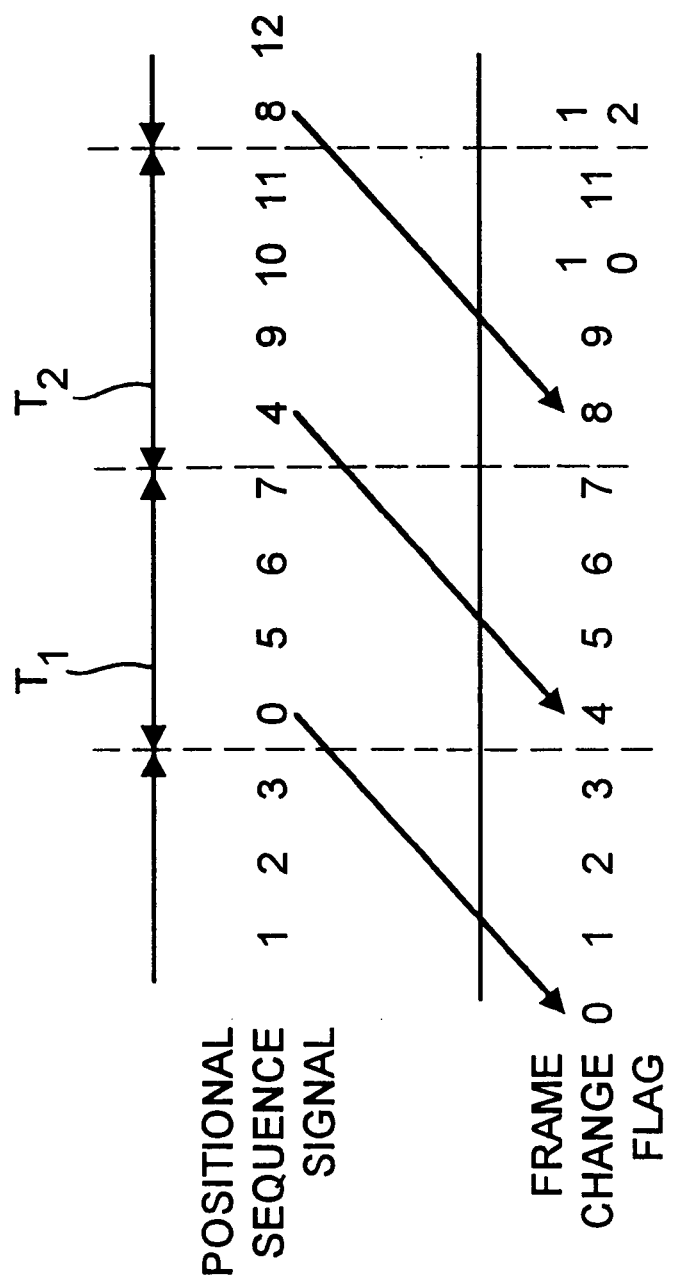
FIGS. 9($a$)–9($b$) are a diagram explaining the rearrangement of reproduction data.
Figure 10:
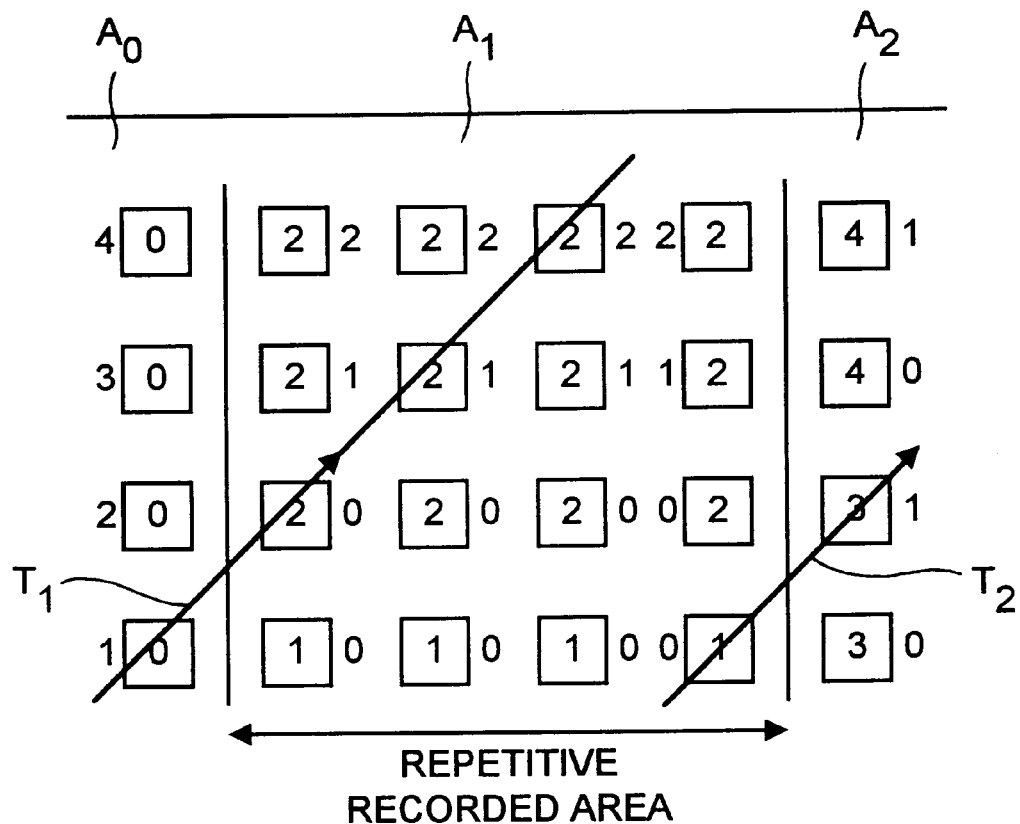
FIG. 10 is a diagram for explaining problems in a conventional example.

FIG. 5 is a block diagram showing another embodiment of the present invention. In FIG. 5, the same component elements as those in FIG. 1 are assigned with the same reference numerals and the explanation thereof will be omitted.

This embodiment differs from the embodiment shown in FIG. 1 in that the dummy data generating circuit 5 is deleted, and there is a special reproduction data arranging circuit 11 and a recording data arranging circuit 12 instead of the special reproduction data arranging circuit 6 and the recording data arranging circuit 7, respectively.

The special reproduction data arranging circuit 11 is capable of making the data arrangement shown in FIG. 2 with an additional ID including a frame-change flag and a positional sequence signal arranged in a sync block. Further, when the top frame data of a specified frame was allocated and recorded on the special reproduction data position in a specified repetitive recording area, if the allocation of that frame data is completed, the special reproduction arranging circuit 11 allocates and arranges the next frame data in the next repetitive recording area without allocating the next frame data until the end of this repetitive recording area.

The recording data arranging circuit 12 records encoded data from the input terminal 1 in the normal reproduction data position and at the same time, by arranging the data that is input to record the output of the special reproduction data arranging circuit 11 on the special reproduction data position, provides the data to the output terminal 8. Further, in this embodiment, if the output of the special reproduction data arranging circuit 11 is not input at a time corresponding to the special reproduction data position, the data arrangement is made to record encoded data from the input terminal on the special reproduction data position.

Next, operation of this embodiment in the construction as described above will be explained referring to the explanatory diagrams shown in FIGS. 6 and 7(a)–7(c). FIGS. 6 and 7 are corresponding to FIGS. 3 and 4, respectively.

The special reproduction data generating circuit 2 generates special reproduction data from input encoded data and provides the data to the special reproduction data arranging circuit 11. Further, the frame flag generating circuit 3 generates frame-change flags and provides them to the special reproduction data arranging circuit 11, and the positional sequence signal generating circuit 4 generates positional sequence signals and provides them to the special reproduction data arranging circuit 11.

Now, it is assumed that special reproduction frame data of the 0-th and the first frames generated by the special reproduction data generating circuit 2 are recordable in five special data units and two special data units of the special reproduction data position, respectively. Further, if the top of the first frame data is recorded on the lowest special reproduction data positions on the tracks in the repetitive recording area A1, the 0-th and the first frame data are recorded as shown in FIG. 6.

When the arrangement of the first frame data is completed, the special reproduction data arranging circuit 11 does not arrange special reproduction data on the remaining special reproduction data positions on the tracks in the repetitive recording area A1. Thus, the recording data arranging circuit 12 allocates encoded data from the input terminal 1 to the remaining special reproduction data positions on the tracks in the repetitive recording area A1. That is, these remaining areas are used as the normal reproduction data recording area.

The special reproduction data arranging circuit 11 arranges and outputs the first frame data of the second frame output from the special reproduction data generating circuit 2 at the top timing of the repetitive recording area A2. The recording shown in FIG. 6 is thus carried out.

The magnetic tape with data thus recorded is traced by the magnetic head so as to obtain the traces T1 and T2 shown in FIG. 6. In this case, the upper half special reproduction data positions on the tracks in the repetitive recording area A1 are used as the normal reproduction data recording area, and therefore, the 0 frame data is reproduced from the lowest special reproduction data positions on the tracks in the repetitive recording area A0 along the along the trace line T1. Then, the first frame data is reproduced from the second special reproduction data positions on the tracks in the repetitive recording area A1. That is, the positional sequence signals of the data sequentially reproduced along the trace line T1 are 1 and 1, respectively as shown in FIG. 7(a).

Further, the top data of the first frame is reproduced from the lowest special reproduction data positions on the tracks in the repetitive recording area A1 along the trace line T2 and then, the second frame data is reproduced from the second special reproduction data positions on the tracks in the repetitive recording area A2. That is, the positional sequence signals of the data sequentially reproduced along the trace line T2 are 0, 1, 2 and 3, respectively as shown in FIG. 7(a).

When reproduction data are rearranged in order of the positional sequence signals, the data on the lowest special reproduction data positions on the tracks in the repetitive recording aria A0 reproduced along the trace line T1 are arranged in front of the reproduction data of the 0-th frame of the positional sequence signal 2. Similarly, the reproduction data of the lowest special reproduction data positions on the tracks in the repetitive recording area A1 reproduced along the trace line T2 are arranged in front of the reproduction data of the first frame of the positional sequence signal 1. Thus, data also can be rearranged properly in this case.

As described above, in this embodiment it is also possible to achieve the same effect as in the embodiment shown in FIG. 1. Further, in this embodiment if valid data are not recorded, the special reproduction data position is used as the normal reproduction data recording area and therefore, there is such an advantage as the recording efficiency can be improved.

As described above, the present invention has such an effect that even when the amount of data for one frame of special reproduction data is relatively small, it is possible to securely rearrange data.

As described above, the present invention can provide an extremely preferable magnetic recording/reproducing apparatus and a data arranging method for use in the apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A magnetic recording/reproducing apparatus for repetitively arranging tracks recorded with the same special reproduction data in a predetermined special reproduction format together with normal reproduction data over a repetitive special reproduction area wherein a head traces across said tracks in a predetermined special reproduction mode, said apparatus comprising:

a recording data arranger which arranges the same special reproduction data on the same recording position on each track in said repetitive recorded special reproduction area;

a special reproduction data generator which generates special reproduction data from input normal reproduction data;

a frame identification signal generator which generates frame identification signals identifying frames of said special reproduction data;

a positional sequence signal generator which generates a positional sequence signal to be sequentially allocated to each special reproduction data recording position on each track, wherein said position sequence signal is initialized at a change of said frame identification signal; and a special reproduction data arranger which provides said special reproduction data from said special reproduction data generator to said recording data arranger in conjunction with said frame identification signal and said positional sequence signal, wherein initialization of said positional sequence signal in said repetitive recorded special reproduction area is limited by one time at most, including a self-initialization associated with a cyclic function of said positional sequence signal, and wherein, when arrangement of said special reproduction data of a specified frame is completed in said repetitive recorded special reproduction area where a predetermined special reproduction data belongs, said special reproduction data arranger records dummy data in special reproduction data recording positions on each track in place of data of a frame following said specified frame in conjunction with both said frame identification signal and said positional sequence signal through said recording data arranger in case of a first special reproduction data of said specified frame being recorded on a predetermined recording position of said special reproduction data on each track.

2. A magnetic recording/reproducing apparatus as claimed in claim 1, wherein, when arrangement of said special reproduction data of said specified frame is completed in said repetitive recorded special reproduction area where said predetermined special reproduction data belongs, said special reproduction data arranger stops outputting said special reproduction data, said frame identification signal, and said positional sequence signal to leave said special reproduction data recording positions for data of a frame following said specified frame in non-recorded states as to special reproduction data, in case of a first special reproduction data of said specified frame being recorded on a predetermined recording position of said special reproduction data on each track.

3. A method for arranging recording data in a magnetic recording/reproducing apparatus for repetitively arranging tracks recorded with the same special reproduction data in a predetermined special reproduction format together with normal reproduction data over a repetitive special reproduction area wherein a head traces across said tracks in a predetermined special reproduction mode, said method comprising:

a recording data arranging process for arranging the same special reproduction data on the same recording position on each track in said repetitive recorded special reproduction area;

a special reproduction data generating process for generating special reproduction data from input normal reproduction data;

a frame identification signal generating process for generating a frame identification signal indicating a frame for said special reproduction data generated from said special reproduction data generating process;

a positional sequence signal generating process for generating a positional sequence signal to be sequentially allocated to each special reproduction data recording position on each track, said positional sequence signal being initialized at a change timing of said frame identification signal; and a special reproduction data arranging process for providing said special reproduction data from said special reproduction data generating process to said recording data arranging process in conjunction with both said frame identification signal and said positional sequence signal, wherein initialization of said positional sequence signal in said repetitive recorded special reproduction area is limited by one time at most including a self-initialization associated with the cyclic function of said positional sequence signal, and wherein, when arrangement of said special reproduction data of a specified frame has completed in said repetitive recorded special reproduction area to which a predetermined special reproduction data belongs, said special reproduction data arranging process records dummy data on special reproduction data recording positions on each track in place of data of a frame following said specified frame in conjunction with both said frame identification signal and said positional sequence signal through said recording data arranging process, in case of a first special reproduction data of said specified frame being recorded on a predetermined recording position of said special reproduction data on each track.

4. A data arranging method as claimed in claim 3, wherein, when arrangement of said special reproduction data of a specified frame has completed in said repetitive recorded special reproduction area where said predetermined special reproduction data belongs, said special reproduction data arranging process stops outputting said special reproduction data, said frame identification signal, and said positional sequence signal to leave special reproduction data recording positions for data of a frame following said specified frame in non-recorded states as to special reproduction data, in case of a first special reproduction data of said specified frame being recorded on a predetermined recording position of said special reproduction data on each track.

* * * * *